United States Patent
Shiu et al.

(10) Patent No.: US 8,958,190 B2
(45) Date of Patent: Feb. 17, 2015

(54) CONTROL CIRCUIT AND SYNCHRONOUS PROTECTION CONTROL SYSTEM

(71) Applicant: Green Solution Technology Co., Ltd., New Taipei (TW)

(72) Inventors: Shian-Sung Shiu, New Taipei (TW); Chih-Chun Sung, Wuxi (CN); Xi Tu, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 337 days.

(21) Appl. No.: 13/633,886

(22) Filed: Oct. 3, 2012

(65) Prior Publication Data

US 2013/0301178 A1 Nov. 14, 2013

(30) Foreign Application Priority Data

May 11, 2012 (CN) .......................... 2012 1 0153187

(51) Int. Cl.
*H02H 3/24* (2006.01)
*H02H 3/00* (2006.01)
(52) U.S. Cl.
USPC .............................................. 361/92; 361/88

(58) Field of Classification Search
USPC ............................................................ 361/92
See application file for complete search history.

(56) References Cited

U.S. PATENT DOCUMENTS 8,654,493 B2 * 2/2014 Wada et al. ...................... 361/86
2010/0053999 A1 * 3/2010 Jang et al. .................. 363/21.01

* cited by examiner

*Primary Examiner* — Dharti Patel
(74) *Attorney, Agent, or Firm* — CKC & Partners Co., Ltd.

(57) ABSTRACT

A control circuit, comprising a protection detection circuit, a protection synchronous output circuit, a protection synchronous input circuit and a protection circuit, is provided. The protection detection circuit is adapted to generate an error notice signal when detecting an error condition. The protection synchronous output circuit is coupled to the protection detection circuit for enabling a level of a protection synchronous pin to be a protection level when receiving the error notice signal. The protection synchronous input circuit is coupled to the protection synchronous pin for generating a synchronous protection signal when the level of the protection synchronous pin has been at the protection level for a predetermined time period. The protection circuit generates a protection signal to make the control circuit enter a protection mode when receiving one of the error notice signal and the synchronous protection signal.

14 Claims, 2 Drawing Sheets

US 8,958,190 B2

CONTROL CIRCUIT AND SYNCHRONOUS PROTECTION CONTROL SYSTEM

RELATED APPLICATIONS

This application claims priority to Chinese Application Serial Number 201210153187.X, filed May 11, 2012, which is herein incorporated by reference.

BACKGROUND

1. Field of the Invention

The present invention relates to a control circuit and a protection control system, and more particularly relates to a control circuit and a protection control system with synchronous protection.

2. Description of Related Art

FIG. 1 is a schematic diagram of a conventional control system. Each control circuit 10 comprises an under-voltage lockout circuit 15 coupled to an input power source Vin. The input power source Vin supplies electric power to the control circuit 10. The under-voltage lockout circuit 15 determines whether a voltage level of the input power source Vin is over low or not according to an under-voltage protection level Vuo for preventing the control circuit 10 from operating incorrectly. The under-voltage lockout circuit 15 outputs an under-voltage lockout signal UVLO to make the control circuit 10 enter an under-voltage lockout protection mode so as to stop operating until the voltage level of the input power source Vin is recovered to a sufficiently high voltage level from the over-low voltage level.

However, due to process errors, the corresponding voltage levels (the time points) of the input power source Vin at which the respective control circuits 10 enter the under-voltage lockout protection mode are different, thus it is quite likely to result in that some of the control circuits 10 enter the under-voltage lockout protection mode and other control circuits 10 do not enter the under-voltage lockout protection mode. The aforementioned asynchronous under-voltage lockout protection (to which similar problems also may happen to other protection functions) causes the control circuits to be operated uncoordinatedly, thus easily resulting in unpredictable operation errors or damages.

SUMMARY

In view of the asynchronous protection problem existing in the conventional circuits, objects of the present invention are to provide a control circuit and a synchronous protection control system, wherein a protection synchronous pin is used for enabling the protection mechanism of the control circuit to be operated synchronously, thus preventing the asynchronous protection problem.

To achieve the aforementioned and other objects, an exemplary embodiment of the present invention provides a control circuit which comprises a protection detection circuit, a protection synchronous output circuit, a protection synchronous input circuit and a protection circuit. The protection detection circuit is adapted to generate an error notice signal when detecting an error condition. The protection synchronous output circuit is coupled to the protection detection circuit and enables a level of a protection synchronous pin to be a first logic level when receiving the error notice signal. The protection synchronous input circuit is coupled to the protection synchronous pin and generates a synchronous protection signal when it is detected that the level of the protection synchronous pin has been at the first logic level for a predetermined time period. The protection circuit is coupled to the protection detection circuit and the protection synchronous input circuit and generates a protection signal to make the control circuit enter a protection mode when receiving one of the error notice signal and the synchronous protection signal.

To achieve the aforementioned and other objects, another exemplary embodiment of the present invention further provides a synchronous protection control system which comprises a plurality of control circuits and a setting element. Each control circuit comprises a protection synchronous pin. The setting element is coupled to the protection synchronous pin of the plurality of control circuits for enabling a level of every protection synchronous pin to be an initial level. Each control circuit comprises a protection detection circuit, a protection synchronous output circuit, a protection synchronous input circuit and a protection circuit. The protection detection circuit is coupled to a common detection end and generates an error notice signal when receiving the common detection end which is at an error condition. The protection synchronous output circuit is coupled to the protection detection circuit and enables the level of the protection synchronous pin to be a protection level when receiving the error notice signal. The protection synchronous input circuit is coupled to the protection synchronous pin and generates a synchronous protection signal when it is detected that the level of the protection synchronous pin has been at the protection level for a predetermined time period. The protection circuit is coupled to the protection detection circuit and the protection synchronous input circuit and generates a protection signal to make the control circuit enter a protection mode when receiving one of the error notice signal and the synchronous protection signal.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
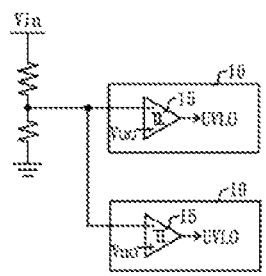
FIG. 1 is a schematic diagram of a conventional control system.
Figure 2:
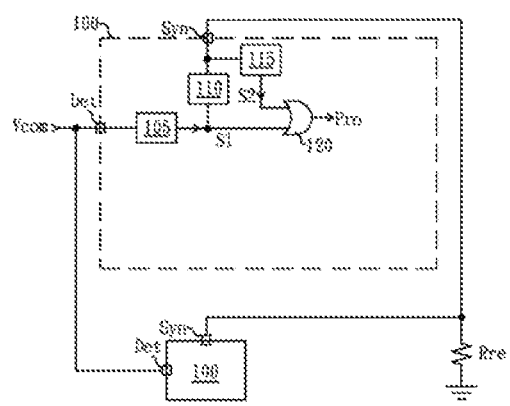
FIG. 2 is a schematic diagram of a synchronous protection control system according to an embodiment of the present invention.

FIG. 2 is a schematic diagram of a synchronous protection control system according to an embodiment of the present invention. The synchronous protection control system comprises a plurality of control circuits 100 and a setting element Rre. Each control circuit 100 comprises a protection synchronous pin Syn. Those protection synchronous pins of the control circuits 100 are coupled mutually. The setting element Rre is coupled to the protection synchronous pins Syn of the control circuits 100. The setting element Rre enables a level of the protection synchronous pins Syn to be an initial level or a logic level. In the present embodiment, the setting element Rre is an impedance element. Each control circuit 100 further comprises a protection detection circuit 105, a protection synchronous output circuit 110, a protection synchronous input circuit 115 and a protection circuit 120. The protection detection circuit 105 is coupled to a common detection end Vcom by a detection pin Det for determining whether the common detection end Vcom has any error condition or not by detecting a voltage level of the common detection end Vcom or a current flowing through the common detection end Vcom. The common detection end Vcom may be an input power source for supplying electric power to the control circuits 100, or a common driving end for driving a load. For example, the control circuits 100 control a corresponding converting circuit to provide a driving voltage or a driving current at the common driving end for driving a load. The protection detection circuit 105 generates an error notice signal S1 when the common detection end Vcom is detected to be at an error condition such as over-voltage, under-voltage, over-current or under-current condition. The protection synchronous output circuit 110 is coupled to the protection detection circuit 105 and enables the level of the protection synchronous pin Syn to be a protection level when receiving the error notice signal S1. Therefore, the control circuit enables the level of the protection synchronous pin Syn to be the protection level from the initial level when one of the control circuits 100 determines that the common detection end Vcom is at the error condition. The protection synchronous input circuit 115 is coupled to the protection synchronous pin Syn and generates a synchronous protection signal S2 when it is detected that the level of the protection synchronous pin Syn has been at the protection level for a predetermined time period. The predetermined time period is used to avoid an erroneous judgment due to noises or signal propagation delays. The protection circuit 120 is coupled to the protection detection circuit 105 and the protection synchronous input circuit 115. The protection circuit 120 generates a protection signal Pro to make the control circuit 100 enter a protection mode when the protection circuit 120 receives one of the error notice signal S1 or the synchronous protection signal S2.

When the protection detection circuit 105 of a certain control circuit 100 detects that the common detection end Vcom is at the error condition, the protection detection circuit 105 generates the error notice signal S1. The protection circuit 120 of the control circuit 100 generates the protection signal Pro according to the error notice signal S1 to make the control circuit 100 enter the protection mode. Simultaneously, the protection synchronous output circuit 110 of the control circuit 100 also enables the level of the protection synchronous pin Syn to be the protection level. Therefore, the protection synchronous input circuits 115 in other control circuit(s) 100 generate the synchronous protection signal S2 when it is detected that the level of the protection synchronous pin Syn has been at the protection level for the predetermined time period. Protection circuits 120 in the other control circuits 100 also generate the protection signal Pro to make corresponding control circuit(s) enter the protection mode. By the foregoing operation, when one of the control circuits 100 enters the protection mode, the other control circuits 100 also enter the protection mode for synchronous protection. All of the protection detection circuits 105 in the control circuits 100 stops generating the error notice signal S1 when all of the protection detection circuits 105 do not detect that the common detection ends Vcom is at the error condition. At this time, all of the protection synchronous output circuits 110 have no action, and the level of the protection synchronous pins Syn are recovered to the initial level by the setting element Rre. Therefore, all of the protection synchronous input circuits 115 stop generating the synchronous protection signal S2. At this time, all of the protection circuits 120 do not generate the protection signals Pro since the error notice signal S1 and the synchronous protection signal S2 are not generated, and thus the control circuits 100 leave the protection mode and then start operating. Therefore, the operations of the control circuits 100 of the present invention also can be recovered synchronously.

Figure 3:
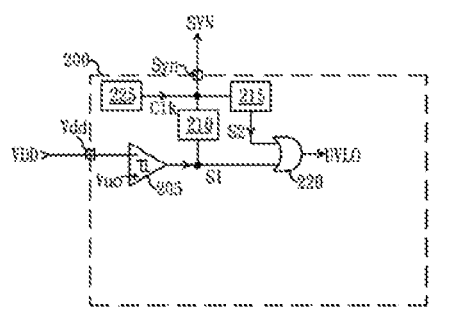
FIG. 3 is a schematic diagram of a control circuit according to an embodiment of the present invention.
Figure 4:
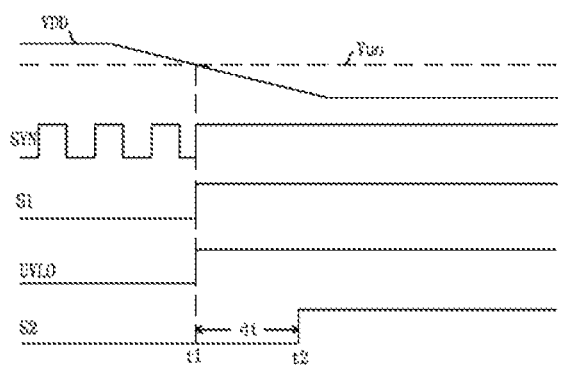
FIG. 4 is a graph showing signal waveforms of the control circuit shown in FIG. 3.

FIG. 3 is a schematic diagram of a control circuit according to an embodiment of the present invention. A control circuit 200 comprises a protection detection circuit 205, a protection synchronous output circuit 210, a protection synchronous input circuit 215 and a protection circuit 220. In the present embodiment, the protection detection circuit 205 is an under-voltage lockout detection circuit, and is coupled to an input power source VDD via a driving pin Vdd for detecting if a level of the input power source VDD is higher than an under-voltage protection level Vuo. FIG. 4 is a graph showing signal waveforms of the control circuit shown in FIG. 3. The control circuit 200 further comprises a clock generator 225. The clock generator 225 is coupled to a protection synchronous pin Syn for generating a clock signal Clk that is outputted as a synchronous signal SYN or for receiving a synchronous signal SYN generated by another control circuit 200 via the protection synchronous pin Syn. Before a time point t1, the level of the input power source VDD is higher than the under-voltage protection level Vuo, and the control circuit 200 operates normally. At this time, the clock signal Clk generated by the clock generator 225 is outputted to the other control circuits 200 via the protection synchronous pin Syn. The clock generator 225 in the control circuit 200 also detects a level of the protection synchronous pin Syn, and synchronously changes the clock signal Clk into a high level when a level of a clock signal Clk generated by a clock generator 225 of a certain control circuits 200 is at the high level. Therefore, operating frequencies of the control circuits 200 are increased to be equal to the highest frequency for synchronous operation.

Before the time point t1, the protection synchronous input circuit 210 is decoupled from the protection synchronous pin Syn for stopping providing any power to influence the level of the protection synchronous pin Syn when the protection synchronous output circuit 210 does not receive the error notice signal S1. At this time, the level of the protection synchronous pin Syn is dominated by other circuits, such as the setting element Rre shown in FIG. 2. At the time point t1, the protection detection circuit 205 generates the error notice signal S1 when the level of the input power source VDD is lower than the under-voltage protection level. The protection synchronous output circuit 210 is coupled to the protection synchronous pin Syn in response to the error notice signal S1 for providing power to increase the level of the protection synchronous pin Syn to be a high level. The protection circuit 220 is triggered to generate an under-voltage lockout signal UVLO to make the control circuit 200 enter an under-voltage protection mode. The protection synchronous input circuit 215 detects that the level of the protection synchronous pin Syn is at the high level for a predetermined time period dt and then generates a synchronous protection signal S2 at time point t2. Hence, protection synchronous input circuits 215 in the other control circuits 200 (not shown) also generate the synchronous protection signals S2 to make corresponding control circuits 200 also enter the under-voltage protection mode.

By the foregoing circuit structure, when one of protection detection circuit in plural control circuits detects the error condition, the other controls circuits will be protected synchronously via the protection synchronous pin. While the protection detection circuits of all of the control circuits detect no error condition, the operations of the control circuits can be recovered synchronously.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A control circuit, comprising:
   a protection detection circuit for generating an error notice signal when detecting an error condition;
   a protection synchronous output circuit which is coupled to the protection detection circuit and enables a level of a protection synchronous pin to be a first logic level when receiving the error notice signal;
   a protection synchronous input circuit which is coupled to the protection synchronous pin and generates a synchronous protection signal when it is detected that the level of the protection synchronous pin has been at the first logic level for a predetermined time period; and
   a protection circuit which is coupled to the protection detection circuit and the protection synchronous input circuit and generates a protection signal when receiving one of the error notice signal and the synchronous protection signal to make the control circuit enter a protection mode.

2. The control circuit according to claim 1, wherein the protection detection circuit is an under-voltage lockout circuit configured to detect an input power source and to generate the error notice signal when a level of the input power source is lower than an under-voltage protection level.

3. The control circuit according to claim 2, wherein the protection synchronous output circuit is coupled to the protection synchronous pin for providing power to the protection synchronous pin when receiving the error notice signal and is decoupled from the protection synchronous pin for stopping providing the power to the protection synchronous pin when not receiving the error notice signal.

4. The control circuit according to claim 2, further comprises a clock generator which is coupled to the protection synchronous pin for outputting or receiving a clock signal.

5. The control circuit according to claim 2, wherein the protection synchronous input circuit stops generating the synchronous protection signal when the level of the protection pin is detected to be at a second logic level, and the protection circuit stops generating the protection signal to make the control circuit leave the protection mode when not receiving any one of the error notice signal and the synchronous protection signal.

6. The control circuit according to claim 1, wherein the protection synchronous output circuit is coupled to the protection synchronous pin for providing a power to the protection synchronous pin when receiving the error notice signal, and is decoupled from the protection synchronous pin for stopping providing the power to the protection synchronous pin when not receiving the error notice signal.

7. The control driving circuit according to claim 1, further comprises a clock generator which is coupled to the protection synchronous pin for outputting or receiving a clock signal.

8. The control circuit according to claim 1, wherein the protection synchronous input circuit stops generating the synchronous protection signal when the level of the protection pin is detected to be at a second logic level, and the protection circuit stops generating the protection signal to make the control circuit leave protection mode when not receiving any one of the error notice signal and the synchronous protection signal.

9. A synchronous protection control system, comprising:
   a plurality of control circuits, each of which comprises a protection synchronous pin; and
   a setting element coupled to the protection synchronous pins of the plurality of control circuits for enabling a level of the protection synchronous pins to be an initial level;
   wherein each of the control circuits comprises a protection detection circuit, a protection synchronous output circuit, a protection synchronous input circuit and a protection circuit, in which the protection detection circuit is coupled to a common detection end and generates an error notice signal when the common detection end is detected to be at an error condition; the protection synchronous output circuit is coupled to the protection detection circuit and enables the level of the protection synchronous pin to be a protection level when receiving the error notice signal; the protection synchronous input circuit is coupled to the protection synchronous pin and generates a synchronous protection signal when it is detected that the level of the protection synchronous pin has been at the protection level for a predetermined time period; and the protection circuit is coupled to the protection detection circuit and the protection synchronous input circuit and generates a protection signal when receiving one of the error notice signal and the synchronous protection signal to make the control circuit enter a protection mode.

10. The synchronous protection control system according to claim 9, wherein the protection detection circuit which is an under-voltage lockout circuit is adapted to detect an input power source and generates the error notice signal when a level of the input power source is lower than an under-voltage protection level.

11. The synchronous protection control system according to claim 10, wherein the setting element is an impedance element.

12. The synchronous protection control system according to claim 10, wherein each of the control circuits further comprises a clock generator which is coupled to the protection synchronous pin for outputting or receiving a clock signal.

13. The synchronous protection control system according to claim 9, wherein the setting element is an impedance element.

14. The synchronous protection control system according to claim 9, wherein each of the control circuits further comprises a clock generator which is coupled to the protection synchronous pin for outputting or receiving a clock signal.

* * * * *